United States Patent Office 3,359,250
Patented Dec. 19, 1967

3,359,250
PROCESS FOR TREATING DIPENTENE
POLYMERS
Henry G. Sellers, Jr., Pensacola, Fla., assignor to Tenneco Chemicals Corporation, a corporation of Delaware
No Drawing. Filed Jan. 8, 1964, Ser. No. 336,384
8 Claims. (Cl. 260—93.3)

This process relates to dipentene polymers. More particularly it relates to a process for the decolorization of dipentene polymers.

It is well known that dipentene can be polymerized to form resinous products that are useful in the manufacture of paper coatings, adhesives, rubber compounds, and other industrial products. Heretofore, however, the preparation of dipentene polymers that are very light in color has been difficult and expensive since the use of highly purified raw materials and extremely careful control of process conditions are required. In addition, no satisfactory process for refining the relatively dark dipentene polymers to produce light-colored products has been known.

It is an object of this invention to provide a process for the decolorization of dipentene polymers. It is a further object of this invention to provide a process for the decolorization of dipentene polymers which is simple and economical. Another object of this invention is to provide a process for treating dipentene polymers wherein the physical properties of the treated polymers other than color remain substantially unchanged. Other objects will be apparent from the detailed description of the invention that follows.

The aforementioned objects may be accomplished in accordance with this invention by contacting dipentene polymers with hydrogen in the presence of a hydrogenation catalyst. As the result of this treatment, the color of the dipentene polymers is substantially lightened without an accompanying loss in yield and wih no perceptible effect on the other physical properties of the polymers.

The process of the present invention may be conveniently carried out by subjecting the dipentene polymers dissolved in a suitable solvent or in the molten state to treatment with hydrogen in the presence of a hydrogenation catalyst. After such treatment, the polymer solutions or the molten polymers are separated from the hydrogenation catalyst and recovered from the solvent if one has been used.

The process of this invention is applicable to dipentene polymers which may be prepared by any known and convenient procedure. For example, dipentene may be polymerized in solution in the presence of a Friedel-Crafts catalyst, such as aluminum chloride, aluminum bromide, stannic chloride, antimony trichloride, ferric chloride, boron trifluoride, or beryllium chloride. When the polymerization step has been completed, the polymer solution may be treated with lime and with an adsorbent material, such as fuller's earth or finely-divided clay, and then heated to dechlorinate it. After filtration, the filtrate may be distilled to remove the solvent and yield the dipentene polymer. If desired, this distillation step may be omitted, and the filtrate without further purification may be hydrogenated in accordance with the present invention.

In a preferred embodiment of this invention, a dipentene polymer prepared by the aforementioned procedure is dissolved in an inert organic solvent, and the resulting polymer solution is contacted with hydrogen in the presence of a hydrogenation catalyst under the conditions hereinafter set forth. After filtration of the hydrogenated mixture, the filtrate is heated to distill off the solvent and thereby yield a decolorized dipentene polymer.

Any organic solvent that will dissolve the dipentene polymer and that is in itself inert when treated with hydrogen in accordance with the present procedure may be used in the practice of this invention. Suitable solvents include monocyclic aromatic hydrocarbons, such as benzene, toluene, or xylene; aliphatic hydrocarbons, such as gasoline, petroleum naphtha, pentane, hexane, heptane, or octane; cyclic hydrocarbons, such as decahydronaphthalene, cyclohexane, and methylcyclohexane; terpene hydrocarbons, such as p-menthane; halogenated hydrocarbons, such as methyl chloride, methylene dichloride, chloroform, carbon tetrachloride, ethyl chloride, ethyl bromide, ethylidene dichloride, and 1,2,2-trichloroethylene; and esters, such as butyl acetate and amyl acetate. A single solvent or a mixture of two or more of these solvents may be used. It is generally preferred that the solvent be a hydrocarbon that has a boiling point below approximately 200° C. since such solvents may be readily separated from the treated polymer by distillation without danger of overheating and consequently darkening the polymer.

The concentration of the dipentene polymer in the solution is not critical and is usually that which will provide solutions having the desired handling characteristics. In most cases the solution contains approximately 10% to 75% by weight of the polymer with the concentration in each case dependent upon such factors as the choice of solvent, the molecular weight of the polymer, and the viscosity desired. When a hydrocarbon solvent is used, the solution preferably contains 30% to 60% by weight of the dipentene polymer.

The hydrogenation catalysts that are used in the practice of this invention include Raney nickel catalysts and noble metal catalysts, such as platinum, platinum oxide, palladium, and palladium oxide. To reduce their cost, the noble metal catalysts are generally used on such inert carriers as carbon, alumina, and chromium oxide. The amount of the hydrogenation catalysts that is used is largely dependent upon the choice of catalyst and is between approximately 0.01% and 10% of the weight of the dipentene polymer. Excellent results have been obtained using 2% to 5%, based on the weight of the polymer, of a Raney nickel catalyst or 0.2% to 5%, based on the weight of the polymer, of a catalyst that contains approximately 5% to 10% of a noble metal or noble metal oxide on an inert carrier.

The process of the present invention may be carried out under the conditions that are ordinarily employed for hydrogenation reactions using Raney nickel and noble metal hydrogenation catalysts. In most cases the hydrogenation is carried out at a temperature in the range of approximately 50° C. to 220° C. When a noble metal catalyst is used, the hydrogenation is preferably carried out at a temperature in the range of 50° C. to 125° C. and at atmospheric pressure. When the hydrogenation is carried out in the presence of a Raney nickel catalyst, the dipentene polymer is treated with hydrogen at a pressure of approximately 200 p.s.i. to 2000 p.s.i. and preferably 400 p.s.i. to 600 p.s.i at a temperature in the range of 150° C. to 200° C. In each case the decolorization of the dipentene polymer is accomplished in a period of approximately 1 hour to 15 hours.

The invention is further illustrated by the examples that follow. It is to be understood, however, that these examples are given solely for the purpose of illustration and that the invention is not to be regarded as being limited to the specific materials or conditions recited therein except as set forth in the appended claims. In the examples all percentages are percentages by weight. The APHA colors were determined by means of a test procedure set forth by the American Public Health Association as reported in "Standard Methods for the Examination of Water and Sewage," 9th edition, 1946, pages 14 and 15. The Gardner colors were determined by using color standards prepared by the H. A. Gardner Co., which are described in "Physical and Chemical Examination of Paints, Varnishes, Lacquers, Colors," Gardner and Sward, 10th edition, 1946, H. A. Gardner Co., Bethesda, Md.

*Example 1*

A dipentene polymer was prepared by the following procedure: To a mixture of 10 grams of aluminum chloride, 250 grams of toluene, and 250 grams of petroleum naphtha (B.P., 118° C.–148° C.) was added 500 grams of dipentene. The reaction mixture was agitated and maintained at 40°–45° C. during the addition of the dipentene. When all of the dipentene had been added, the mixture was allowed to stand for one hour. Then 25 grams of calcium hydroxide and 25 grams of acid-treated clay were added. The resulting mixture was heated with agitation until approximately half of the solvent had distilled off and then at its reflux temperature for 15 hours without the removal of any additional solvent. Following hot filtration, the mixture was heated to a pot temperature of 220° C., sparged with steam until 500 parts of water was present in the distillate, and cooled to room temperature. There was obtained 350 grams of a solid dipentene polymer that had a ball and ring softening point (ASTM E–28–51T) of 125° C. A 50% solution of this polymer in mineral spirits had a Gardner color of 3.

*Example 2*

Three hundred and fifty grams of a polymer prepared by the procedure described in Example 1 was dissolved in 350 grams of p-menthane. This solution and 10 grams of Raney nickel which had been washed first with methanol, then twice with toluene, and finally twice with p-menthane were placed in a rocking type autoclave. The autoclave was flushed with hydrogen and then pressurized to 500 p.s.i. with hydrogen. The hydrogenation was carried out by slowly raising the temperature of the reaction mixture to 175°–200° C. and maintaining a hydrogen pressure of 400 p.s.i. to 600 p.s.i. until absorption of hydrogen ceased. Approximately 1.1 grams of hydrogen reacted with the dipentene polymer during the hydrogenation. The reaction mixture was cooled to room temperature and filtered. The filtrate was heated to 200° C. and sparged with steam to remove the solvent. The resulting dipentene polymer had a ball and ring softening point of 125° C. and a Gardner color (50% solution in mineral spirits) of 1.

*Example 3*

Two hundred and fifty grams of a dipentene polymer prepared by the procedure described in Example 1 was dissolved in 250 grams of a solvent mixture containing 80% of petroleum naphtha and 20% toluene. To the resulting solution, which had an APHA color of 120, was added 1.25 grams of a 5% palladium-on-carbon hydrogenation catalyst. The reaction mixture was heated to 100° C. and maintained at this temperature for 7 hours during which time hydrogen at atmospheric pressure was bubbled through it. The reaction mixture was filtered to remove the hydrogenation catalyst. The filtrate, which was a solution containing 50% of the dipentene polymer, had an APHA color of 40. This solution was heated to 200° C. and sparged with steam to remove the solvent and yield a clear, substantially water-white solid dipentene polymer.

What is claimed is:

1. The process for the decolorization of discolored dipentene polymers which comprises contacting said polymers with an amount of hydrogen that is sufficient to decolorize the polymers and insufficient to affect the other physical properties of the polymers in the presence of a hydrogenation catalyst selected from the group consisting of Raney nickel and noble metal catalysts.

2. The process for the decolorization of discolored dipentene polymers which comprises contacting said polymers with an amount of hydrogen that is sufficient to decolorize the polymers and insufficient to affect the other physical properties of the polymers at a temperature in the range of approximately 50° C. to 220° C. and in the presence of a hydrogenation catalyst selected from the group consisting of Raney nickel and noble metal catalysts.

3. The process for the decolorization of discolored dipentene polymers which comprises the steps of forming a solution of said dipentene polymer in an inert organic solvent and contacting said solution with an amount of hydrogen that is sufficient to decolorize the polymer and insufficient to affect the other physical properties of the polymer at a temperature in the range of approximately 50° C. to 220° C. and in the presence of a hydrogenation catalyst selected from the group consisting of Raney nickel and noble metal catalysts.

4. The process for the decolorization of discolored dipentene polymers which comprises the steps of contacting a solution containing approximately 10% to 75% by weight of said dipentene polymer in an inert organic solvent with an amount of hydrogen that is sufficient to decolorize the polymer and insufficient to affect the other physical properties of the polymer at a temperature in the range of 150° C. to 200° C. and a pressure in the range of 200 p.s.i. to 2000 p.s.i. in the presence of a Raney nickel catalyst, filtering the solution so treated, and distilling the filtrate so obtained to recover the decolorized dipentene polymer.

5. The process for the decolorization of discolored dipentene polymers which comprises the steps of contacting a solution containing 30% to 60% by weight of said dipentene polymer in a hydrocarbon solvent with an amount of hydrogen that is sufficient to decolorize the polymer and insufficient to affect the other physical properties of the polymer at a temperature in the range of 150° C. to 200° C. and a pressure in the range of 400 p.s.i. to 600 p.s.i. and in the presence of 2% to 5%, based on the weight of said polymer, of a Raney nickel catalyst, filtering the solution so treated, and distilling the filtrate so obtained to recover the decolorized dipentene polymer.

6. The process for the decolorization of discolored dipentene polymers which comprises the steps of contacting a solution containing approximately 10% to 75% by weight of said dipentene polymer in an inert organic solvent with an amount of hydrogen that is sufficient to decolorize the polymer and insufficient to affect the other physical properties of the polymer at a temperature in the range of 50° C. to 220° C. in the presence of 0.01% to 10%, based on the weight of said polymer, of a noble metal hydrogenation catalyst, filtering the solution so treated, and distilling the filtrate so obtained to recover the decolorized dipentene polymer.

7. The process for the decolorization of discolored dipentene polymers which comprises the steps of contacting a solution containing 30% to 60% by weight of said dipentene polymer in a hydrocarbon solvent with an amount of hydrogen that is sufficient to decolorize the polymer and insufficient to affect the other physical properties of the polymer at a temperature in the range of 50° C. to 125° C. and at atmospheric pressure in the presence of 0.01% to 10%, based on the weight of said polymer, of a noble metal hydrogenation catalyst, filtering the solution so treated, and distilling the filtrate so obtained to recover the decolorized dipentene polymer.

8. The process for the decolorization of discolored dipentene polymers which comprises the steps of contacting a solution containing 30% to 60% by weight of said polymer in a hydrocarbon solvent with an amount of hydrogen that is sufficient to decolorize the polymer and insufficient to affect the other physical properties of the polymer at a temperature in the range of 50° C. to 125° C. and at atmospheric pressure in the presence of 0.2% to 5%, based on the weight of said polymer, of a 5% palladium-on-carbon hydrogenation catalyst, filtering the solution so treated, and distilling the filtrate so obtained to recover the decolorized dipentene polymer.

References Cited

UNITED STATES PATENTS 2,249,112 7/1941 Carmody _____ 260—93.3

JOSEPH L. SCHOFER, *Primary Examiner.*

L. EDELMAN, *Assistant Examiner.*